Nov. 30, 1937.  R. KILLEFER  2,100,856
REVOLVING RIPPER
Filed July 5, 1935  3 Sheets-Sheet 2

INVENTOR.
Robert Killefer
BY Lyon & Lyon
ATTORNEYS

Nov. 30, 1937.   R. KILLEFER   2,100,856
REVOLVING RIPPER
Filed July 5, 1935   3 Sheets-Sheet 3

Inventor
Robert Killefer
By Lyon & Lyon
Attorneys

Patented Nov. 30, 1937

2,100,856

UNITED STATES PATENT OFFICE 2,100,856

REVOLVING RIPPER

Robert Killefer, Los Angeles, Calif., assignor, by mesne assignments, to Killefer Manufacturing Corporation, a corporation of California Application July 5, 1935, Serial No. 29,897

10 Claims. (Cl. 97—103)

This invention relates to an implement of a type carrying a gang of tools normally held in an active position at or about the ground level, for performing any needed operation on the ground or at the ground. While the invention may be applied to implements used for various purposes, in the present specification it is described as applied to an implement known as a ripper, and provided with a plurality of ripper tools which are drawn through the earth slightly below the ground level. Implements of this type may be used for agricultural purposes, or for ripping up old street pavements on repaving jobs or the like.

The implement includes a frame, which is advanced over the ground, and is provided with a plurality of arms carrying the tools.

One of the objects of this invention is to improve the general construction of implements of this type, and particularly to provide simple means for holding the tool arms readily in an inactive position raised above the ground.

The forces exerted by the drag upon the tools when in the ground is considerable, and one of the objects of the invention is to provide an improved construction for the frame of the implement and for mounting the arms on the frame, which is well adapted to distribute the stresses throughout the frame, and to provide a rigid support for the arms; also to provide means for holding the tools in their active position, which will be capable of resisting the considerable torque developed by the tools, tending to rotate them about the axis of rotation of the arms that carry them.

A further object of the invention is to provide a construction for the frame, which will facilitate mounting the same upon ground wheels that will support the frame, and located so as not to interfere with a frame construction providing ample bearing supports for the tool-carrying arms.

A further object of the invention is to provide an implement of this kind, which is so constructed as to enable the tool-carrying arms to be rotated automatically on a transverse axis into an inverted position with the tools held elevated; and in a position in which the tool arms will maintain themselves by gravity in their inactive position.

Further objects of the invention will appear hereinafter.

The invention consists in the novel parts and combination of parts to be described hereinafter, all of which contribute to produce an efficient revolving ripper.

A preferred embodiment of the invention is described in the following specification, while the broad scope of the invention is pointed out in the appended claims.

In the drawings:

Fig. 5 is a view corresponding to Fig. 3, and illustrating how each tool arm is revolved over to swing the tool to an inactive elevated position.

Figure 1:
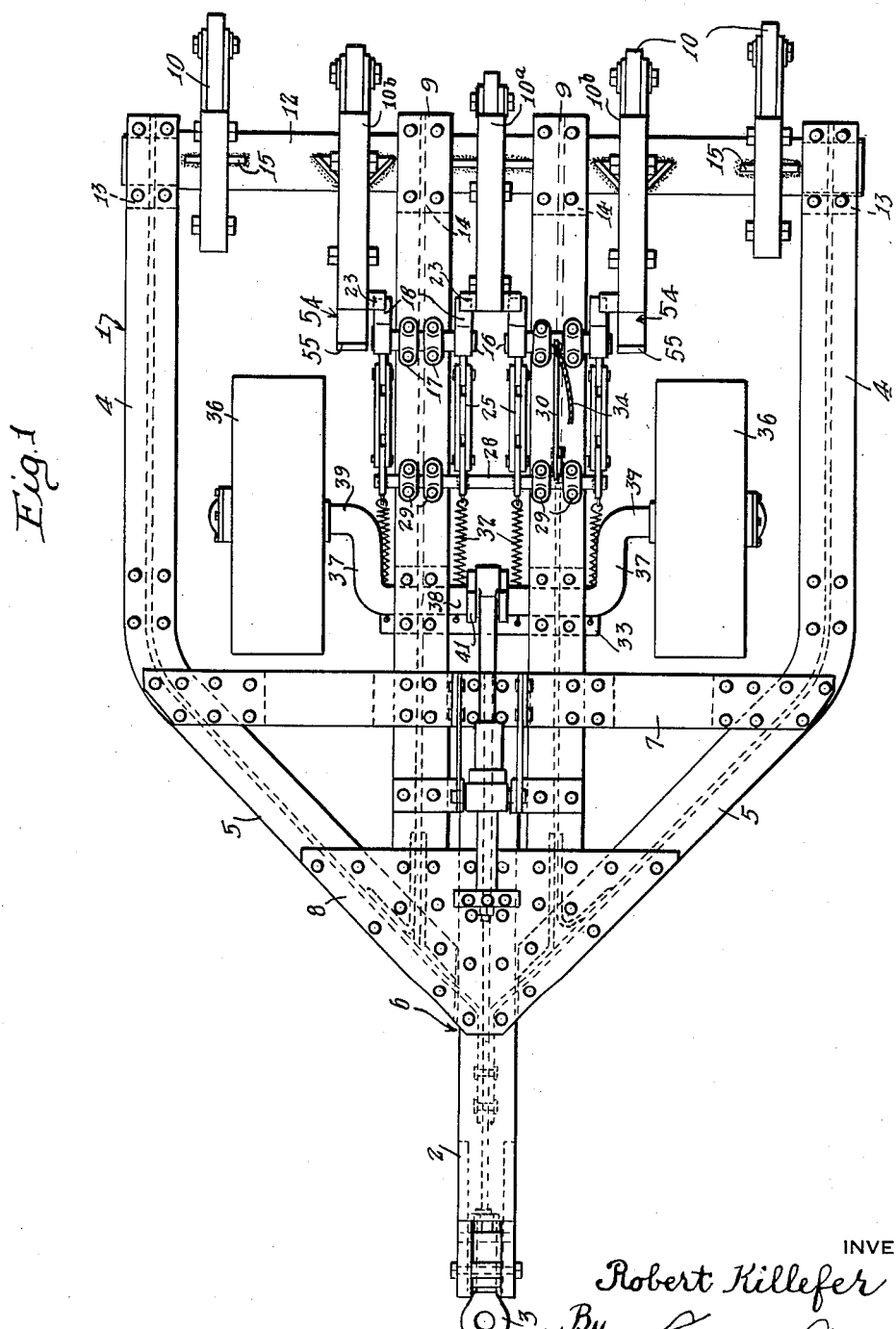
Figure 1 is a plan of an implement embodying my invention and illustrating the invention applied in such a way that the implement can be drawn along behind a tractor. This view illustrates the tool arms in their depressed or active position.

Referring more particularly to the parts, 1 indicates the frame of the implement. This frame may be of any suitable construction, and may if desired, be provided with means for advancing it over the ground. However, in the present instance, the frame is constructed to be operated as a trailer to be drawn along by a tractor or other means. In the present instance, this frame 1 includes a forwardly located drawhead 2, the forward end of which is provided with means for attaching the same to a draw bar 3. The rear part of the frame preferably comprises two outboard side bars 4, which are substantially parallel with each other at the rear, but which are bent to form extensions 5 that converge toward each other in a forward direction, and which are riveted to the rear end of the draw-head 2. The draw-head 2 extends rearwardly beyond its junction 6 with the converging extensions 5, and its rear end is riveted to a cross bar or cross head 7, the ends of which are riveted to the side bars.

At the junction 6 the construction preferably includes horizontal upper and lower gusset plates 8, which are riveted to the flanges of the bars. The bars out of which the frame is constructed, may be made of any suitable structural shape such as angle irons or I-bars.

The frame preferably includes intermediate or inboard frame bars 9, which may be two in number; and these two bars 9 are located near the central longitudinal axis of the implement with their forward ends riveted to the cross end 7 and to the gusset plates 8.

At the rear ends of all of the frame bars 4, 4 and 9, 9, a plurality of tool arms are mounted for rotation on a transverse axis. These tool arms are indicated generally by the reference numeral 10. Any suitable means may be provided for enabling these tool arms to be rotated up into an inverted position, with the tools such as rippers 11 carried above the ground level, and with the tools in an inverted position (see Fig. 3).

In the present instance, the tool arms 10 are preferably secured rigidly to a stout transverse shaft 12, the ends of which are mounted in bearings 13 on the under side of the outboard bars 4, and the middle portion of this shaft is similarly mounted in inboard bearings 14 secured under the intermediate frame bars 9.

Any suitable means may be employed for securing the arms 10 rigidly to the shaft 12. In the present instance, I prefer to provide the lateral sides of the arms with downwardly projecting fins or keys 15 that are received in longitudinal slots in the shaft, the fins 15 being welded to the shaft at the slots, (see Fig. 1). The arms 10 preferably include three intermediate arms, including a central arm 10a that is located in the space between the intermediate frame bars 9, and two other intermediate arms 10b that are located adjacent to the outer sides of the intermediate frame bars 9.

Figure 2:
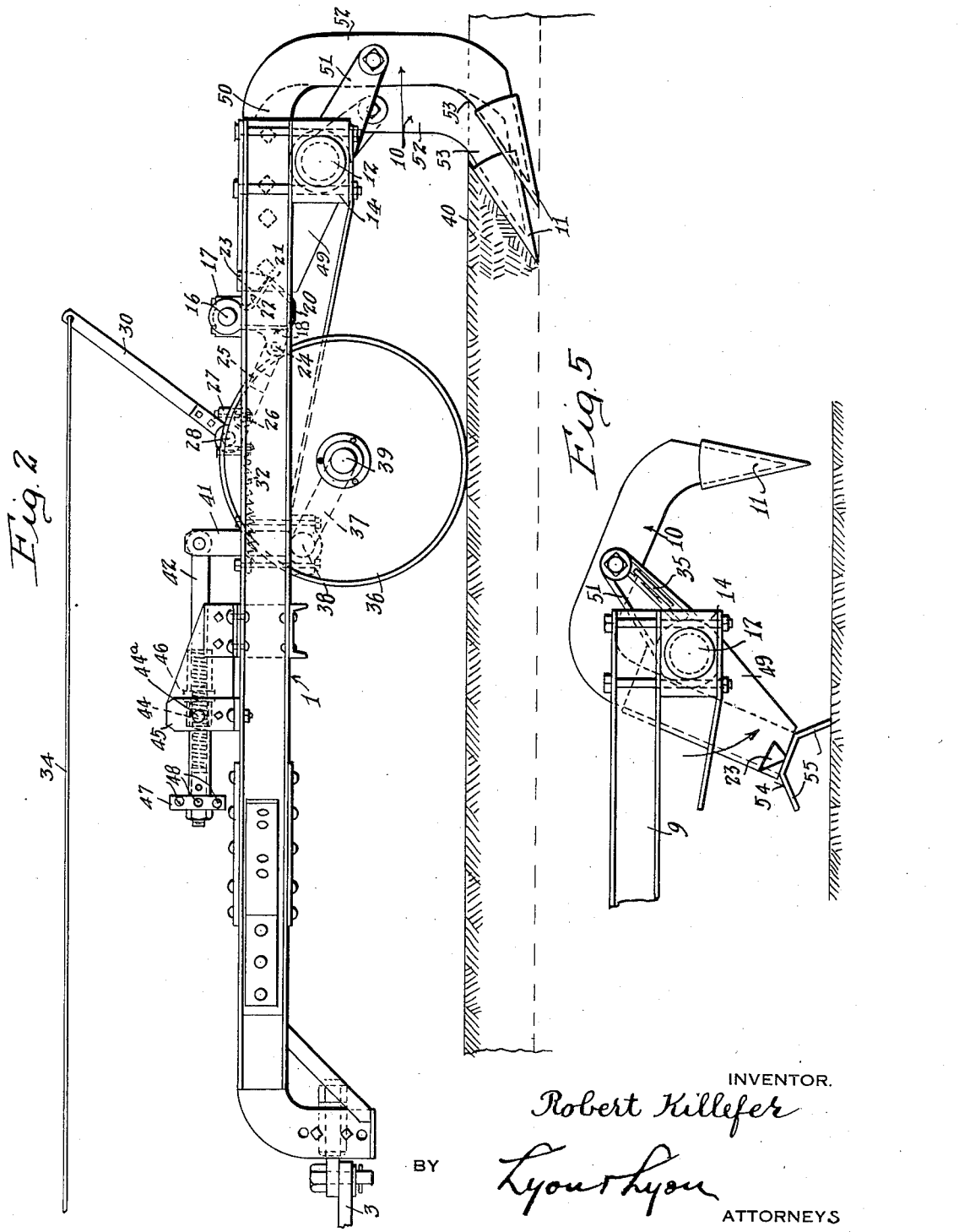
Fig. 2 is a side elevation of the implement illustrated in Fig. 1, showing the parts in the same relation that they have in Fig. 1, and showing the ground level and a portion of the earth under the implement in section.
Figure 3:
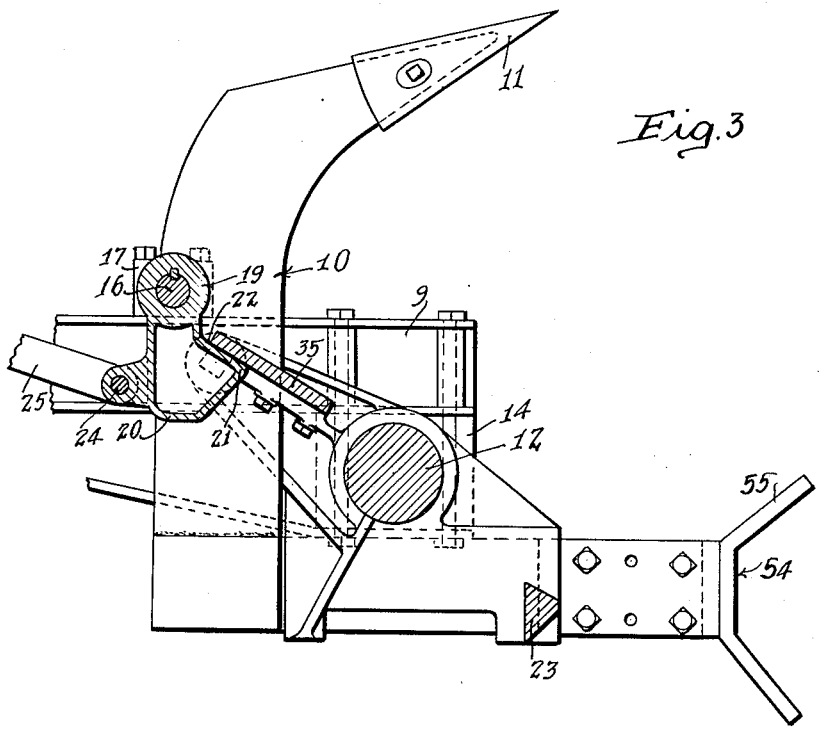
Fig. 3 is a vertical section taken in a front and rear plane, and particularly illustrating means whereby the tool arms may be held in their inactive and elevated position. This view is upon an enlarged scale, and adjacent parts of the illustrated mechanism are broken away.

In the operation of the tool, the ripper tools 11 are dragged through the earth and considerable torque is exerted in the shaft 12, tending to rotate it in an anti-clockwise direction, as viewed in Fig. 2. For this reason I provide holding means of substantial construction for resisting this torque and for holding the tool arms in their working position or active position. To this end I provide holding means capable of engaging all three of the intermediate arms 10a and 10b. In order to accomplish this, I prefer to provide a transverse pawl shaft 16, (see Fig. 1), which is mounted in bearings 17 to rotate above the inboard frame bars 9. This pawl shaft is provided with a plurality of means such as pawls 18 carried by the shaft, and which can be moved at will by rotating the shaft, to release the arms 10a and 10b and permit the shaft 12 to rotate to bring all the arms into their inactive elevated position, as illustrated in Fig. 3. In this view one of the pawls is illustrated in cross section, and preferably consists of a casting having a hub 19 above, which is rigidly mounted on the pawl shaft 16. The pawl is formed as a casting with a cored body 20 that extends down from the hub, and this body is provided with a rearwardly projecting nose 21 that presents a face 22 preferably inclined as shown. In the normal position of the arms, that is to say, when the tools are in the ground, this face 22 is engaged by a projecting dog or lug 23 on its corresponding arm 10a or 10b. As indicated in Fig. 1, there is a holding dog 18 on each side of the central arm 10a, and a lug 23 corresponding to each of these dogs.

Figure 4:
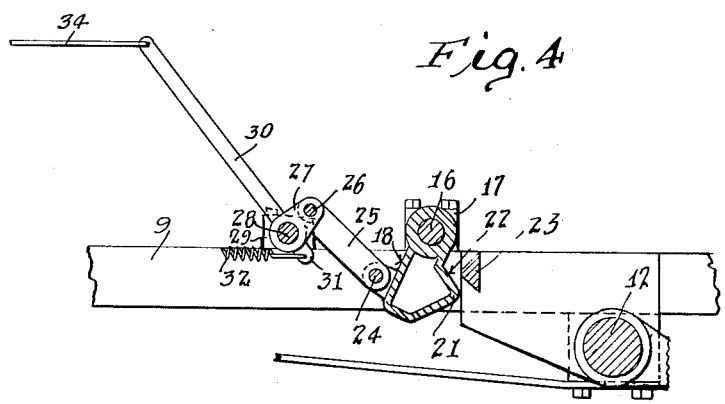
Fig. 4 is a view somewhat similar to Fig. 3, but omitting many parts, and this view illustrates the manner in which the holding means is released to permit the tool arms to be revolved up into their inverted and inactive position.

In order to operate the dogs 18 to release the arms from their working position, the forward side of each dog is pivotally connected by a pin 24 to the rear end of a bifurcated link 25, and the forward end of this link is attached by a pin 26 to a short arm 27 that is rigidly secured on a rock shaft 28, said rock shaft mounted for rotation in bearings 29 on the upper faces of the inboard frame bars 9. In addition to this, the rock shaft is provided with a rigid actuating lever 30. Each of the short arms 27 is provided with a downwardly projecting short arm 31, and each of these arms 31 preferably carries a return spring 32, the forward end of which is attached to an anchor plate 33 that extends transversely and is secured to the upper side of the inboard frame bars 9. In the working position of the arms 10 the crank or short arm 26 is nearly in line with the position of the pin 24, so that the pin 26 is located slightly below "dead center", that is to say, below a line joining the center of the shank 28 with the pin 24 (see Fig. 2). On this account the thrust of each pawl 18 developed by the drag of the tools 11 in the earth, is exerted through the bifurcated link 25 in such a way that this thrust does not tend to rotate the shaft 28. The upper end of the operating lever 30 is connected to a link or cable 34, (see Fig. 2) which enables the lever 30 to be pulled forwardly at will by the driver of the tractor. By pulling on this cable 34 the lever 30 can be rotated forwardly as indicated in Fig. 4. This will operate to swing all the dogs 18 downwardly as indicated in Fig. 4, thereby releasing the lugs 23. The arms may then drop down at the front and be swung up over the shaft 12 as described hereinafter to bring them into a position such as illustrated in Fig. 3. When this is done a stop plate 35 attached to each arm will come against the face 22 to hold the arms in this upright or inactive position, it being understood that after the dogs 23 have been released, the lever 30 is permitted to swing back to the position in which it is shown in Fig. 2. This return movement of the lever 30 is effected by the springs 32.

In the space between the outboard side bars 4 and each inboard frame bar 9, ground wheels 36 are carried, said wheels being mounted on downwardly projecting arms 37 extending downwardly from an axle 38. These arms 37 are preferably integral with the axle, and are formed by bending it down as indicated. Each arm 37 terminates in a horizontal extension or bearing arm 39 on which the corresponding wheel 36 is mounted to rotate. The axle 38 can be adjustably rotated on its axis to regulate the position of the arms 37 to adjust the height of the frame from the ground line 40. For this purpose the axle is provided with a bifurcated upwardly projecting arm or lever 41, which is pivotally attached to an adjusting screw 42 which extends forwardly and passes through a long nut or sleeve which is swivelled in a yoke 44 mounted on trunnions 44a mounted in brackets 45 secured to the upper side of the frame bars 9. The sleeve has an enlarged collar 46 that thrusts against the yoke 44. The rear end of the adjusting sleeve 43 is provided with a socket head 47 having radial sockets 48 for inserting a removable lever for rotating this sleeve 46 to effect an adjustment of the adjusting screw 42 in a forward or rearward direction to raise or lower the frame.

As indicated in Fig. 2, each arm 10 is provided with a bifurcated saddle plate 49 that fits over the body 50 of each arm, and each of these saddle plates has a downwardly and rearwardly extending arm 51, which is bolted at its end to the vertical extension 52 of each arm. The lower ends of the arms terminate in forwardly projecting heads 53, which carry the ripper tools 11.

The forward ends of the saddle brackets 49 for the intermediate arms 10b are provided each with a foot 54 (see Fig. 3), having diverging extensions 55 which act as dogs to engage the ground when the ripper arms are released by the pawls 18. As soon as the lugs 23 on the arms are released, then the arms swing backwardly out of the ground, and when they reach a position where the points of the rippers 11 are about at the ground level, the arms 10 will be tilted forwardly sufficiently to enable the dogs 55 to engage the ground. As soon as this takes place, the forward movement of the frame will swing the arms 10 further in a forward direction and carry them sufficiently forward to bring their center of gravity forward of the shaft 12, and the arms will then fall by gravity down to their inactive position, as shown in Fig. 3.

It will be noted that the general form of each arm 50 is such that it presents two extensions projecting at an angle to each other, and this angle is preferably a right angle. The arms are mounted so that the axis of rotation is located in this angle. This is illustrated in Fig. 5, in which the shaft 12 is mounted in bearings under the longitudinal frame bars 4 and 9. It will also be noted that the diverging extensions 55 of the feet 54 project in the general plane in which the implement advances.

It is understood that the embodiment of the invention described herein is only one of the many embodiments this invention may take, and I do not wish to be limited in the practice of the invention, nor in the claims, to the particular embodiment set forth.

What I claim is:

1. In an implement of the kind described, the combination of a frame adapted to be advanced over the ground, a plurality of arms mounted for rotation on the frame on a transverse axis and carrying tools respectively at their lower ends, each of said arms having two extensions substantially at right angles to each other with said axis of rotation located in the angle between said extensions, movable means in the path of the arms for normally holding the said arms in a position to maintain the tools at or about the ground level, said arms capable of being revolved on the axis in a rearward direction at their lower ends, to swing them over the axis, and means carried by the arms to engage said movable member to hold the arms in an inactive position with the tools held elevated.

2. In an implement of the kind described, the combination of a frame adapted to be advanced over the ground, said frame having a pair of outboard side bars, and having an inboard intermediate frame bar located adjacent the longitudinal central axis of the implement, a transverse shaft with bearings supporting the same for rotation on said frame bars, a plurality of arms carried on the said shaft and carrying tools respectively at their lower ends, said arms capable of being revolved on the axis of the shaft in a rearward direction at their lower ends to bring the tools to an elevated inactive inverted position, and means for holding the arms in a position to maintain the tools at or about the ground level, and also in the said elevated inverted position with the tools carried above the shaft.

3. In an implement of the kind described, the combination of a frame adapted to be advanced over the ground, said frame including outboard frame bars and including a pair of intermediate inboard frame bars, a transverse shaft with bearings supporting the same on said frame bars, a plurality of arms carried by said shaft with ripper tools carried thereby adapted to be drawn through the earth, said arms capable of being revolved with the shaft in a rearward direction at their lower ends, and means for holding the shaft in a position to maintain the tools in a depressed and active position, and for holding the tools in an inverted inactive position above the shaft.

4. In an implement of the kind described, the combination of a frame adapted to be advanced over the ground, said frame including outboard frame bars and including a pair of intermediate inboard frame bars, a transverse shaft with bearings supporting the same on said frame bars, a plurality of arms carried by said shaft with ripper tools carried thereby adapted to be drawn through the earth, said arms capable of being revolved with the shaft in a rearward direction at their lower ends, and means for holding the arms in a position to maintain the tools in a depressed and active position, and for holding the shaft in an inverted inactive position above the shaft, and an axle supported on said intermediate frame bars, and ground wheels carried by said axle in the space between the intermediate frame bars and the outboard frame bars.

5. In an implement of the kind described, the combination of a frame adapted to be advanced over the ground, including outboard frame bars and a pair of intermediate inboard frame bars located adjacent the central longitudinal axis of the implement, a transverse shaft with bearings supporting the same on said frame bars, a plurality of arms rigid with the said shaft carrying tools respectively at their lower ends, said arms including a central arm located between the intermediate frame bars and two arms located adjacent the outer sides of the intermediate frame bars, a transverse pawl shaft carried on the intermediate frame bars, pawls carried thereby, the said central arm and its two adjacent arms having means for engaging said pawls for normally holding the arms in an active position to maintain the tools at or about the ground level, and manually operated means for actuating the pawl shaft to release the arms.

6. In an implement of the kind described, the combination of a frame adapted to be advanced over the ground, an arm mounted for rotation on the frame on a transverse axis, a tool carried by the arm, a holding pawl pivotally mounted on the frame, said arm having a part for engaging the pawl for normally holding the arm in its active position with the tool near the ground, a link pivotally connected with the holding pawl, an arm having an axis of rotation on the frame and having a pivotal connection with the link, said last pivotal connection being located substantially on dead center between the pivotal connection of the link with the pawl and the axis of rotation of the arm, so that the thrust exerted through the link is substantially in line with the axis of rotation of the arm; and an operating lever for moving the arm at will about its axis of rotation to actuate the pawl to release the arm.

7. In an implement of the kind described, the combination of a frame adapted to be advanced over the ground, an arm mounted for rotation on the frame on a transverse axis, a tool carried by the arm, a holding pawl pivotally mounted on the frame, said arm having a part for engaging the pawl for normally holding the arm in its active position with the tool near the ground, a link pivotally connected with the holding pawl, an arm having an axis of rotation on the frame and having a pivotal connection with the link, said last pivotal connection being located substantially on dead center between the pivotal connection of the link with the pawl and the axis of rotation of the arm, so that the thrust exerted through the link is substantially in line with the axis of rotation of the arm; and an operating lever for moving the arm at will about its axis of rotation to actuate the pawl to release the arm, said arm having a second part for engaging the holding pawl to maintain the arm in an elevated position with the tool held in an inactive position above the ground.

8. In an implement of the kind described, the combination of a frame adapted to be advanced over the ground, an arm mounted for revolution on the frame on a transverse axis, a tool carried by the arm, a part mounted to rotate with the arm on the said axis, manually controlled holding means in the path of said part for holding the arm in a position to maintain the tool in operative position in the ground, all of said parts cooperating so that when the manually controlled holding means is released, the continued advance of the frame will enable the drag of the ground on the tool to raise the tool and thereby rotate the lower end of the arm in a rearward direction, said arm having an extension forward of the axis of rotation, said extension having a foot at its end for engaging the ground and thereby continue the revolution of the arm on the axis to bring the tool into an elevated and inverted position, said foot having a body attached to the end of the extension and having diverging extensions at its ends projecting in the plane in which the implement advances.

9. In an implement of the kind described, the combination of a frame, a plurality of ripper arms, each of said ripper arms having extensions forming an angle with each other, a ripper tool carried by one of said extensions on each arm, a transverse shaft carried on the frame and affording an axis of rotation for the ripper arms, said shaft located in the angle between the extensions of each arm, and supporting means for the arms mounted on the shaft attached to both the said extensions of said arms.

10. In an implement of the kind described, the combination of a frame having a plurality of front and rear frame bars, shaft bearings secured on the under sides of said bars at the rear end thereof, a shaft mounted in said bearings, a plurality of ripper arms, each ripper arm having two extensions disposed substantially at right angles to each other, and supporting means for the ripper arms attached to both extensions of the arms, and supporting the arms on the shaft so that the shaft is located in the angle between the extensions of the arms.

ROBERT KILLEFER.